(12) United States Patent
Smith et al.

(10) Patent No.: US 7,925,690 B2
(45) Date of Patent: Apr. 12, 2011

(54) PRIORITISING PHONEBOOK NUMBERS IN A TELEPHONE

(75) Inventors: Alan Andrew Smith, Farnborough (GB); Julie Stuart, legal representative, Longfield (GB); Simon Staddon, Devon (GB)

(73) Assignee: QUALCOMM Incorporated, San Diego, CA (US)

( * ) Notice: Subject to any disclaimer, the term of this patent is extended or adjusted under 35 U.S.C. 154(b) by 1027 days.

(21) Appl. No.: 10/546,553

(22) PCT Filed: Nov. 1, 2004

(86) PCT No.: PCT/US2004/036541
§ 371 (c)(1),
(2), (4) Date: Apr. 19, 2007

(87) PCT Pub. No.: WO2005/043873
PCT Pub. Date: May 12, 2005

(65) Prior Publication Data
US 2008/0123829 A1   May 29, 2008

(51) Int. Cl.
*G06F 15/16* (2006.01)
*H04M 1/00* (2006.01)

(52) U.S. Cl. ......... 709/203; 709/223; 709/245; 455/405

(58) Field of Classification Search .................. 703/203, 703/228; 455/405; 379/356; 709/203, 228, 709/245
See application file for complete search history.

(56) References Cited

U.S. PATENT DOCUMENTS

| | | | |
|---|---|---|---|
| 6,249,579 B1 | 6/2001 | Bushnell | |
| 6,301,350 B1 * | 10/2001 | Henningson et al. | 379/220.01 |
| 6,529,724 B1 * | 3/2003 | Khazaka et al. | 455/405 |
| 6,584,188 B2 * | 6/2003 | Kim | 379/211.02 |
| 6,606,381 B1 | 8/2003 | Wunsch | |
| 6,731,746 B1 * | 5/2004 | Usami | 379/356.01 |
| 6,988,236 B2 * | 1/2006 | Ptasinski et al. | 714/758 |
| 2002/0064263 A1 | 5/2002 | McBrearty et al. | |
| 2002/0151334 A1 | 10/2002 | Sharma | |
| 2002/0198027 A1 | 12/2002 | Rydbeck | |
| 2003/0017847 A1 * | 1/2003 | Toupin | 455/557 |
| 2003/0125016 A1 | 7/2003 | Tsuchiyama | |
| 2008/0120129 A1 * | 5/2008 | Seubert et al. | 705/1 |
| 2008/0177994 A1 * | 7/2008 | Mayer | 713/2 |

FOREIGN PATENT DOCUMENTS

| | | |
|---|---|---|
| EP | 0477854 B1 | 11/1997 |
| EP | 0709996 B1 | 10/2004 |

* cited by examiner

*Primary Examiner* — Khanh Q Dinh
(74) *Attorney, Agent, or Firm* — Nicholas A. Cole

(57) ABSTRACT

A circuit for a telephone, having a data store for storing user data including telephone numbers and associated data, and sorting means (46) for sorting the user data for display. The sorting means sorts the user data according to frequency of use (e.g. frequency of calls received and frequency of connections requested) of the telephone numbers.

20 Claims, 3 Drawing Sheets

PRIORITISING PHONEBOOK NUMBERS IN A TELEPHONE

FIELD OF THE INVENTION

This invention relates to telephones, such as mobile radio telephones or other telephones having phonebook storage capable of storing telephone numbers.

BACKGROUND OF THE INVENTION

It is common in the mobile radio telephone field to provide a radio telephone with a memory in which telephone numbers and other data can be stored. This memory, typically known simply as a phonebook, can store a telephone number (which may be manually entered or may be received in the form of a caller ID number or from a directory service) and a corresponding name or nickname which is typically entered manually by a user through a keypad. Phonebooks are becoming a very valuable resource to telephone users and greatly facilitate ease of usage, avoiding the need for paper lists, diaries and telephone directories.

As phonebooks grow in popularity and size, more and more effort is directed towards the ergonomic use of a phonebook. The ease of use of a telephone can be critical to the user's purchasing choice when choosing a telephone.

Most mobile phone users have a peer group with which they communicate. It is typical for a phonebook to store the telephone numbers and names of this group in alphabetical order or in some manually entered order. A problem with an alphabetical order of storing and presentation is that the phonebook becomes unwieldy when it grows to a long list of numbers. Mobile telephone generally have very small displays and are able to display only a few names at a time, so some scrolling mechanism is required to enable the user to jump to the particular section of the alphabetical list. Mobile telephones have very limited keypads (typically just 12 keys and some function keys), so it is not possible to enable a user to jump to a specific letter in the alphabet without requiring several key presses. It is a problem that phonebooks become filled with names and numbers of persons who need to be contacted only very infrequently alongside names and numbers of persons who need to be contacted on a much more frequent basis. Access to the latter group of numbers is hampered by the congested nature of the phonebook.

The manually ordered alternative, in which the user selects the first phonebook locations of his or her more popular numbers and lower order locations for less popular numbers is not convenient. The nature of telephone usage is that telephone numbers grow and decline in their relevance to the user, depending upon business being transacted. For example, if a user is selling a house, his or her agent's telephone number may become the most important number in the phonebook, but when the house is sold, that number may never be required again. It is typical to provide an incoming call register or an outgoing call register that logs the most recent incoming or outgoing calls (e.g. the last ten), and this is a useful feature for quickly accessing a number that is currently in high use, but these registers do not fulfil all the user's needs. For example, if the last ten outgoing calls have all been to the same number, the outgoing call register may be filled with just one number repeated ten times.

There is a need to provide telephone users with a more convenient mode of access to phonebook and other telephone numbers for dialing.

SUMMARY OF THE INVENTION

According to the invention, a circuit for a telephone is provided, the circuit having a data store for storing user data including telephone numbers and associated data, and sorting means for sorting the user data for display, characterized in that the sorting means sorts the user data according to frequency of use of the telephone numbers.

The user data may be sorted according to the number of calls received from respective telephone numbers and/or according to the number of calls made to respective telephone numbers.

Counting means may be provided for counting the number of times a call is received having a given calling telephone number within a predetermined period and/or the number of time a call is made or requested having a given called telephone number.

The invention also provides for a telephone having a circuit as described above, and a display for displaying the called numbers sorted by the sorting means.

In accordance with another aspect of the invention, a circuit is provided for a telephone, the circuit having means for receiving calling numbers of incoming calls, means for requesting connections to parties identified by called numbers, and means for providing telephone items to an output for display. The telephone items are sorted for display according to a sort order dependent on frequency of calls received and frequency of connections requested.

A specific embodiment of the invention will now be described, by way of example only, with reference to the drawings.

DETAILED DESCRIPTION OF THE PREFERRED EMBODIMENT

Figure 1:
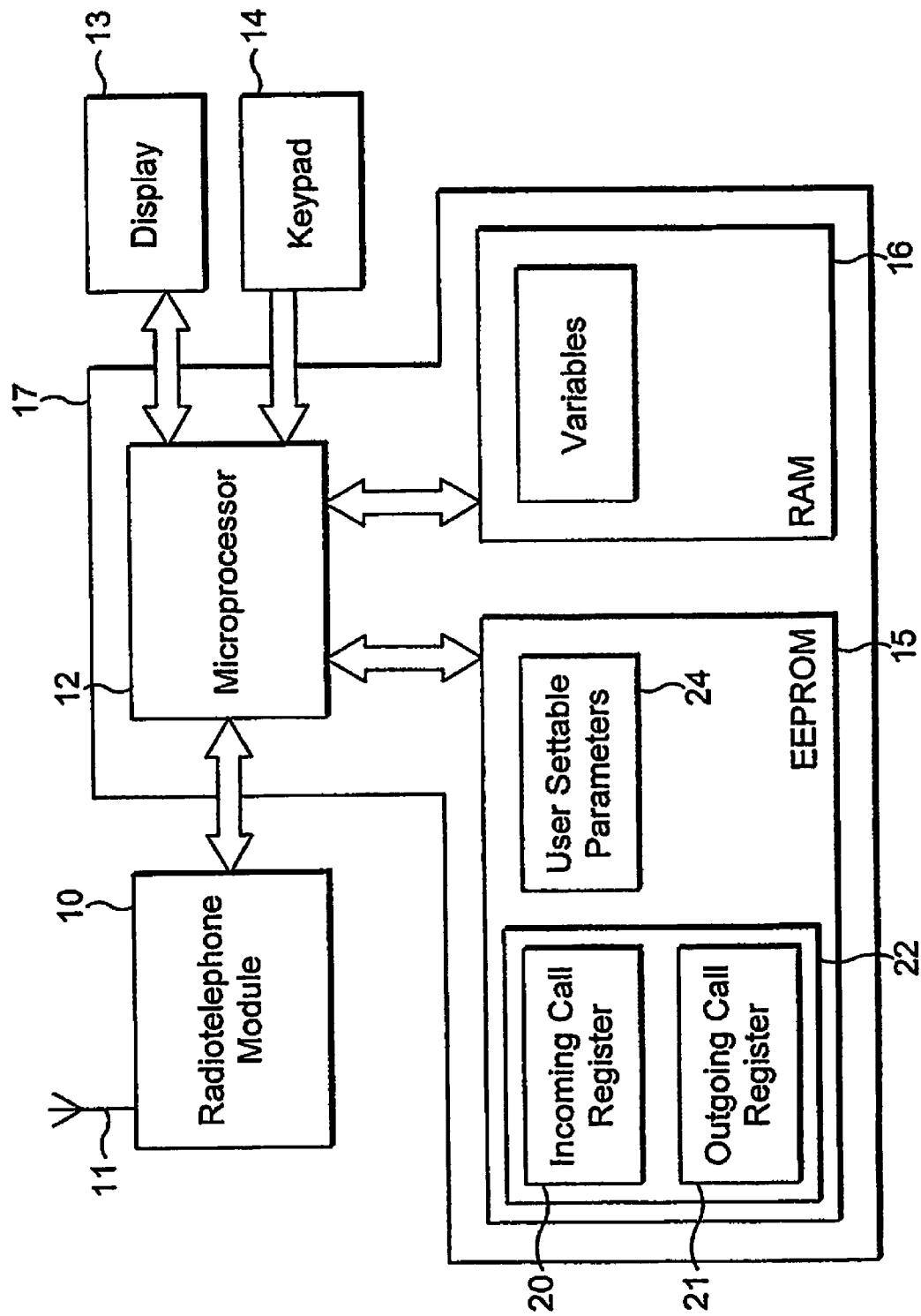
FIG. 1 is a hardware block diagram illustrating the structure of a mobile radio telephone in accordance with the preferred embodiment of the invention.

FIG. 1 illustrates a mobile radio telephone device having a radio telephone module 10 (e.g. a GSM or IS-95 standard radio module) coupled to an antenna 11 and a microprocessor 12. Coupled to the microprocessor are a display 13, a keypad 14, a read-only memory (e.g. a flash EEPROM) 15 and a random access memory 16. The microprocessor 12 and the ROM 15 and the RAM 16 can together be integrated into a single circuit 17 for forming a telephone when combined with the radiotelephone module 10 and the other elements, but it will be understood by those skilled in the art that the various circuits shown can be partially deconstructed and combined in various integrated forms.

In the EEPROM 15 there is shown a phonebook 22 having an incoming call register 20 and an outgoing call register 21. The phonebook 22 is, in effect, a database that stores telephone numbers and associated data (such as names and nicknames, but possibly also date and time of entry and attributes such as business/personal etc.) It is immaterial whether the registers 20 and 21 are considered to be part of the phonebook 22 (e.g. entries in that database having their own incoming/outgoing call attributes) or whether they are considered as separate data registers. For ease of explanation, it is illustrated in FIG. 1 that the incoming call register 20 and the outgoing call register 21 are each part of the phonebook 22.

In operation, the radio telephone module 10 communicates with a radio telephone base station via the antenna 11 and receives calls from other parties (via fixed telephones or other mobile radio telephones). When a call is received by the radio telephone module 10, control channel information received indicates to the radio telephone module 10 the telephone number of the calling party. The calling party has the option of withholding the calling number, in which case the radio telephone module 10 receives an indication that the calling party number (caller ID) is withheld. When the radio telephone module 10 receives the incoming call, this is presented to the microprocessor 12 as an event, and all information regarding the incoming call is provided to the microprocessor 12, including the caller ID or the withholding of the caller ID.

The microprocessor 12 has a software program that determines the disposition of an incoming call. For example, the microprocessor 12 can cause a ring tone to be generated or can generate a vibrate signal or can divert the call to voicemail or perform other functions. The caller ID can be displayed on the display 13 to allow the user to make an informed choice as to whether to answer the call, and the user can answer the call using the keypad 14 or some other off-hook activation switch. Operation of the microprocessor 12 is in part determined by user-settable parameters 24 stored in ROM 15. Examples of user-settable parameters are: the selection of ring tone, the selection of ring versus vibrate, the delay before switching to voicemail, etc. The microprocessor 12 stores (in the incoming call register 20) information regarding the incoming call, including the caller ID and any other relevant information such as time and date of receipt.

In outgoing call operation, the user dials a number using the keypad 14, and the number is typically displayed in the display 13. When the number has been dialed, the user presses a key on the keypad 14 to place the call, and the microprocessor 12 instructs the radio telephone module 10 to initiate a call to that telephone number. In the meantime, the called number is stored in the outgoing call register 21. If the call is accepted by the called party, the radio telephone module 10 informs the microprocessor 12 that the call has been accepted, and the user is able to conduct two-way communication via an audio channel (not shown).

As an alternative to manually dialing a number in the keypad 14, the user can select a number to be dialed from a phonebook 22 in the ROM 15. The keypad 14 can be used to select a phonebook menu option among menu options displayed on the display 13. When the phonebook menu option is selected, a list of phonebook numbers is displayed in the display 13. The list of numbers need not be related to the incoming call register or the outgoing call register, but if desired, the contents of one of these registers can be selected for display. The user can use the keypad 14 to scroll through the displayed numbers to select the desired number for dialing.

As an alternative menu item in the microprocessor's menu, the software can permit a user to dial a number from the incoming call register 20. In a manner similar to the phonebook 22, the numbers in the incoming call register 20 are displayed in the display 13 and the user uses the keypad 14 to scroll through these numbers to select a number for dialing. This is a particularly useful feature for quickly returning a call to an active contact number. The incoming call register 20 may be divided into calls that have been answered and calls that have not been answered. It is particularly useful to enable a user to dial numbers that are unanswered. On the other hand, there are circumstances where the unanswered calls are of lesser interest to the user, for example where they are unsolicited incoming calls.

The outgoing call register 21 in ROM 15 may be used in the same manner as the phonebook 22 or the incoming call register 20 to facilitate the dialing of a number by the user. The outgoing call register stores a list of the numbers most recently dialed and these are inherently numbers of value to the user. Frequently these numbers will also be present in the phonebook 22, but this will not always be the case. The incoming call register 20 and the outgoing call register need not duplicate information that is in the phonebook 22. To avoid duplication of data and thereby reduce memory space usage, the incoming call register 20 and the outgoing call register can store an index number, indexing a location in the phonebook 22 where the number and name of the relevant party are stored.

In the past, it has been common to sort the contents of the phonebook 22 either by location number or in alphabetical order. In the case of storing by location number, the onus is on the user to store his or her most important numbers at low index locations, so that these appear at the top of the list and therefore are the first to be displayed in any list displayed on display 13. In the case of alphabetical order, there is no correlation between order and importance, and if the phonebook 22 is a very long list of numbers, it can be a great inconvenience to have to scroll through it to find a desired number for dialing.

Figure 2:
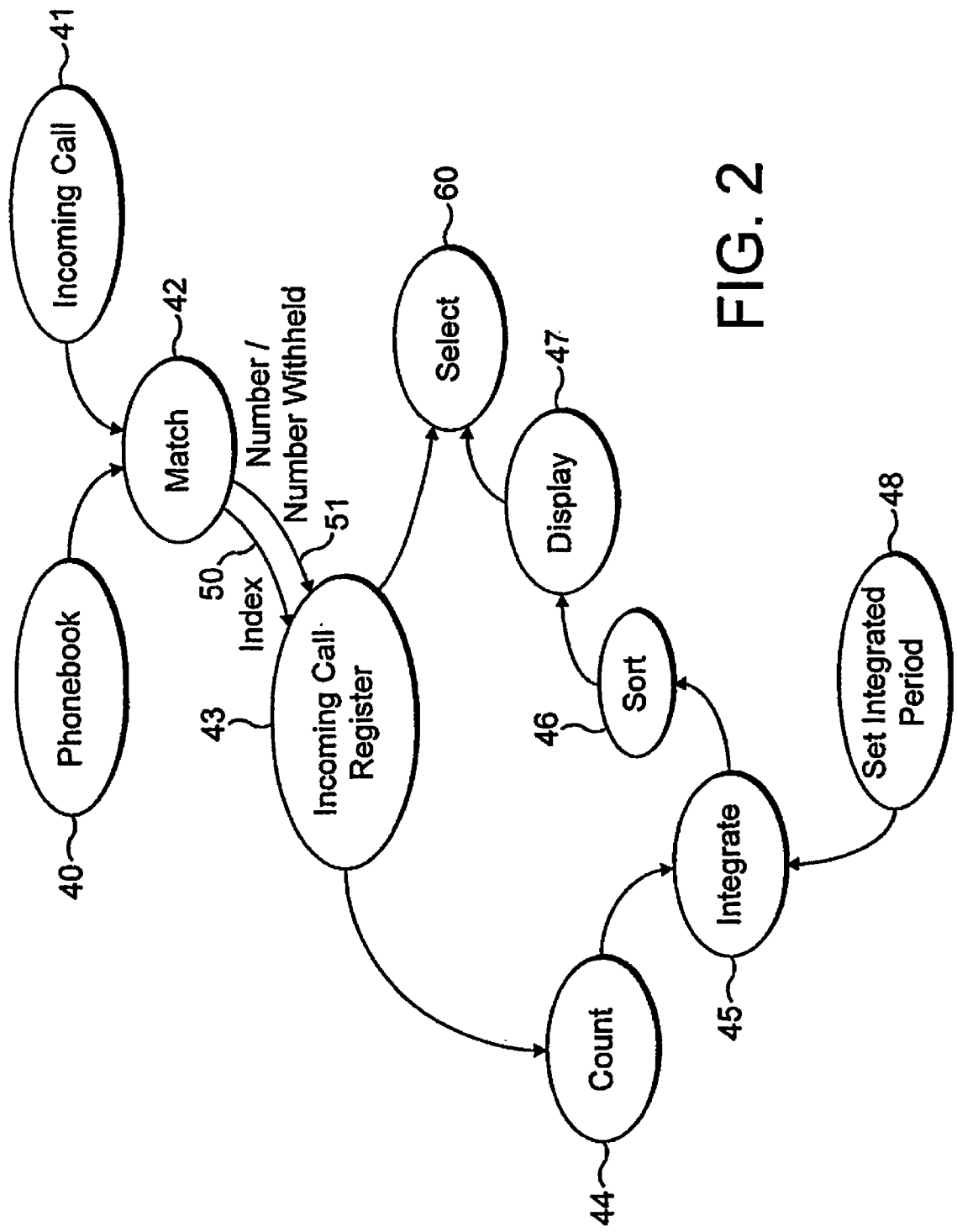
FIGS. 2 and 3 are process flow diagrams illustrating operation of software running in the microprocessor of FIG. 1.

Referring to FIG. 2, the software of microprocessor 12 that is involved in an incoming call is shown in greater detail. FIG. 2 illustrates that microprocessor 12 runs a number of processes, including a phonebook process 4U, an incoming call process 41, a matching process 42, an incoming call register process 43, count, integrate, sort and display processes 44 to 47, a set integration period process 48 and a select process 60.

In operation, a user can initiate the phonebook process 40 to manually enter telephone numbers and corresponding names into the phonebook 22. When a call is received, the radio telephone module 10 informs the microprocessor 12 that an incoming call is being received, and the microprocessor 12 searches (process 42) for a match between the caller ID received within the incoming call (if any) and the telephone numbers in the phonebook 22. Note that in this matching process, leading digits in the telephone number are not critical, as these may vary according to country codes and area codes. If there is a match identified, the match process 42 delivers to the incoming call register process 43 an index number 50 identifying an index in the phonebook 22 where the details of this calling party can be found. These details may include the calling party's name as entered by the user on a previous occasion. If there is no match, the matching process 42 simply delivers to the incoming call register 43 the raw telephone number 51 of the calling party, or if the calling party has withheld the caller ID, this information is delivered to the incoming call register process 43.

The incoming call register process 43 stores the details of the incoming calls e.g. the index numbers of parties identified in the phonebook 22 or the raw telephone numbers. The incoming call register process 43 stores the day and time of receipt. It has a limited capacity, so it deletes incoming call information that exceeds a certain capacity or that has been received before a certain date. As an example, the incoming call register 43 may store 8 days of data. As another example, it does not store the entire data each time a call is received, but rather it stores the data for a particular calling party on the first occurrence of a received call and thereafter stores the time and data of repeated occurrences of calls received from that party. It also records whether the incoming call was or was not answered by the user.

Associated with the incoming call register process 43 is a counting process 44. This process counts the number of times a call has been received from each calling party stored in the incoming call register. Process 45 integrates the counter values for different calling parties over an integration period. By way of example, the integration period may be one week. Process 45 in this case indicates which party has been the most frequent caller in the last 7 days. (It will readily be understood by one of ordinary skill in the art that processes 44 and 45 may not be separable and may be the same process). In accordance with process 48, a user may select an alternative integration period, for example one month or two days. The selected period is stored as a user settable parameter 24 in ROM 15. The usefulness of this feature is explained below.

Sorting process 46 sorts the data from the incoming call register 43 in order of frequency of occurrence, and display process 47 displays this information on the display 13. In this manner, the party who is the most frequent caller in the integration period appears at the top of the list of incoming callers. The information displayed in display process 47 may simply be the name of the calling party or, if the calling party is not included in the phonebook 22 and therefore there has been no match in process 42, display process 47 displays the raw telephone number of the calling party. In process 60, the user can select a number for dialing, whereupon the process of FIG. 3 commences.

The operation is now described with reference to an example. By way of example, a given phonebook entry that becomes less popular over time will have a weekly total count that reduces to zero over a 7 days period.

Example 1

Day 1: Number=01234 567890 3, 4, 6, 7, 4, 2, 2 Weekly Total=28
Day 2: Number=01234 567890 0, 3, 4, 6, 7, 4, 2 Weekly Total=26
Day 3: Number=01234 567890 0, 0, 3, 4, 6, 7, 4 Weekly Total=24
Day 4: Number=01234 567890 0, 0, 0, 3, 4, 6, 7 Weekly Total=20
Day 5: Number=01234 567890 0, 0, 0, 0, 3, 4, 6 Weekly Total=13
Day 6: Number=01234 567890 0, 0, 0, 0, 0, 3, 4 Weekly Total=7
Day 7: Number=01234 567890 0, 0, 0, 0, 0, 0, 3 Weekly Total=3
Day 8: Number=01234 567890 0, 0, 0, 0, 0, 0, 0 Weekly Total=0

The number is progressively moved down the popularity list on a day-by-day basis. By Day 8, the number has a weekly total of zero. This could happen if the person who previously had the Number 01234 567890 moves house or changes their existing mobile subscription and gets allocated a new number.

The above arrangement has a number of advantages. One advantage is that the display 13 is not unnecessarily filled with the same telephone number when multiple calls have been received from the same party. Another advantage is that a party making frequent calls to the unit is frequently (but not always) a high priority contact to whom an outgoing call may need to be placed.

A low-use user may select a longer integration period than might be selected by a high-use user. Users who have bursts of concentrated activity with selected contacts and then move on to other contacts will prefer a shorter integration time than users who have more enduring contacts.

In a modification of the arrangement described, the incoming call register 43 is divided into incoming answered calls and incoming unanswered calls, and a menu option is provided to the user to select the display of either the incoming answered calls or the incoming unanswered calls. Each of these portions of the incoming call register can be sorted and displayed in the manner described.

Figure 3:
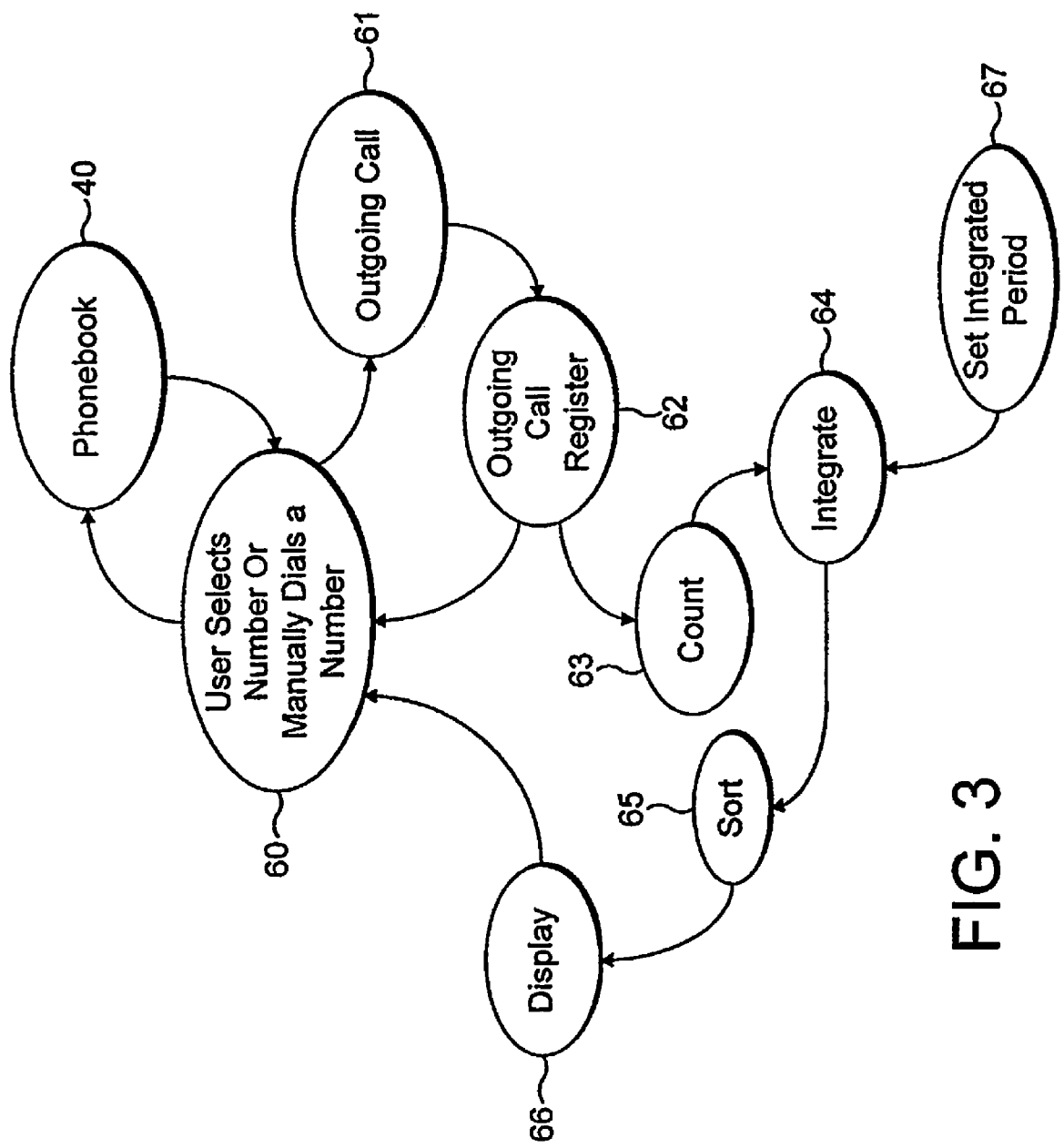

Referring to FIG. 3, processes performed by the microprocessor 12 in the operation of placing outgoing calls are illustrated. In addition to the phonebook process 40 and the selection process 60, there is an outgoing call processor 61, an outgoing call register processor 62, count, integrate, sort and display processes 63 to 66 and a set integration process 67.

In operation, a user wishing to place an outgoing call can first look up a number in the phonebook 22 using the phonebook process 40 or can manually dial the number into the keypad 14. Alternative options are for the user to use the select process 60 already described in relation to FIG. 2, thereby selecting a number from the incoming call register 20 or to select a number from the outgoing call register in a manner described below.

Having selected a number for dialing, an outgoing call is placed by means of process 61 and the number dialed is stored in outgoing call register process 62. As for the incoming call register process, the outgoing call register can be divided into first and second parts, one part logging outgoing calls that have been successful, i.e. where the recipient has answered, and the other part logging unanswered outgoing calls. The count, integrate, sort and display processes 63 to 66 are identical to those described with reference to FIG. 2. The integration period for the integrate process 64 is user-selectable, as for process 45. The period set may be the same or different from the period selected for process 45. The outcome of display process 66 is a display of the most recently dialed numbers or parties and the user can select one of these parties in selection process 60. Upon selection of a party for dialing, the actual telephone number for dialing can be found in the phonebook 22 or in the outgoing call register.

One or more of the count, integrate, sort and display processes of FIGS. 2 and 3 can be combined, whereby a single list of numbers is displayed combining outgoing and incoming calls and sorted by total count, where a number is counted once for each time it appears in the incoming call register and once for each time it appears in the outgoing call register. For example, if desired, the daily count figures for each number could record all successful in coming calls from Number 01234 567890 and all successful (connected) calls to Number 01234 567890. This will then give a more balanced view of which phonebook entries are popular with the handset user, rather than basing the daily count purely on the number of successful calls to the number. This distinction between "outgoing only" and "incoming and outgoing" accounting could be user selectable via the handset menu system.

In this manner, the user is provided with an alternative way to find a popular phonebook entry, which might otherwise require many key presses using conventional alphabetic sorting. The user is presented with the most popular phonebook entries in descending order of popularity, i.e. most popular first.

It will be understood that the above description has been given by way of example only. For example, the count, integration and sort processes can be implemented in a variety of ways and need not necessarily be separated out in the manner described. Also, the exact flow of data between processes is not critical. For example, it does not matter where a particular data item is stored and whether particular processes index that storage location. Similarly, it does not matter whether the outgoing call register and incoming call register are separated or whether these are a single register. These can be combined as a single register with various attributes to indicate whether an entry is an incoming call, an outgoing call, a successful or an unsuccessful call. Various modifications of detail can be made by one of ordinary skill in the art within the spirit and scope of the invention as set forth in the appended claims and equivalents thereof.

The invention claimed is:

1. A mobile phone method of managing an electronic telephone address-book having a plurality of contacts, comprising:
    associating a frequency-of-use parameter with each contact for a current date and for each day indicated by a time period parameter identifying a number of days over which received calls and sent calls are to be monitored;
    incrementing the frequency-of-use parameter associated with a contact for the current date each time a call is received from a telephone number associated with that contact;
    incrementing the frequency-of-use parameter associated with a contact for the current date each time a call is sent to the telephone number associated with that contact;
    summing the frequency-of-use values for each contact for the current date and for the number of days indicated by the time period parameter;
    comparing the summed frequency-of-use values of each contact to select a number of contacts indicated by a configurable list size parameter having the highest frequency-of-use values;
    sorting the selected contacts in accordance with the summed frequency-of-use values; and
    populating a display with the sorted selected contacts.

2. The mobile phone method of claim 1, further comprising:
    prompting a user to select a time period value;
    receiving the user's selection of the time period value; and
    setting the time period parameter identifying a number of days over which received calls and sent calls are to be monitored as the time period value selected by the user.

3. The mobile phone method of claim 1, wherein incrementing the frequency-of-use parameter associated with a contact for the current date each time a call is received from a telephone number associated with the contact comprises:
    incrementing the frequency-of-use parameter only when the received call is accepted by a user operating the mobile phone.

4. The mobile phone method of claim 1, wherein incrementing the frequency-of-use parameter associated with a contact for the current date each time a call is received from a telephone number associated with the contact comprises:
    incrementing the frequency-of-use parameter only when the received call is not answered by a user operating the mobile phone.

5. The mobile phone method of claim 1, further comprising:
    populating the display with a second set of selected contacts;
    associating a second frequency-of-use parameter with each contact for a current date and for each day indicated by the time period parameter;
    incrementing the second frequency-of-use parameter associated with a contact for the current date each time a call is received from a telephone number associated with that contact and accepted by a user of the mobile phone;
    summing the second frequency-of-use values for each contact for the current date and for the number of days indicated by the time period parameter;
    comparing the summed second frequency-of-use values of each contact to select the second set of contacts having the highest second frequency-of-use values;
    sorting the second set of selected contacts in accordance with the summed second frequency-of-use values; and
    populating the display with the sorted second set of selected contacts.

6. A mobile phone configured with an electronic telephone address-book having a plurality of contacts, comprising:
    means for associating a frequency-of-use parameter with each contact for a current date and for each day indicated by a time period parameter identifying a number of days over which received calls and sent calls are to be monitored;
    means for incrementing the frequency-of-use parameter associated with a contact for the current date each time a call is received from a telephone number associated with that contact;
    means for incrementing the frequency-of-use parameter associated with a contact for the current date each time a call is sent to the telephone number associated with that contact;
    means for summing the frequency-of-use values for each contact for the current date and for the number of days indicated by the time period parameter;
    means for comparing the summed frequency-of-use values of each contact to select a number of contacts indicated by a configurable list size parameter having the highest frequency-of-use values;
    means for sorting the selected contacts in accordance with the summed frequency-of-use values; and
    means for populating a display with the sorted selected contacts.

7. The mobile phone of claim 6, further comprising:
    means for prompting a user to select a time period value;
    means for receiving the user's selection of the time period value;
    means for setting the time period parameter identifying a number of days over which received calls and sent calls are to be monitored as the time period value selected by the user.

8. The mobile phone of claim 6, wherein means for incrementing the frequency-of-use parameter associated with a contact for the current date each time a call is received from a telephone number associated with the contact comprises:
    means for incrementing the frequency-of-use parameter only when the received call is accepted by a user operating the mobile phone.

9. The mobile phone of claim 6, wherein means for incrementing the frequency-of-use parameter associated with a contact for the current date each time a call is received from a telephone number associated with the contact comprises:
    means for incrementing the frequency-of-use parameter only when the received call is not answered by a user operating the mobile phone.

10. The mobile phone of claim 6, further comprising:
    means for populating the display with a second set of selected contacts;
    means for associating a second frequency-of-use parameter with each contact for a current date and for each day indicated by the time period parameter;
    means for incrementing the second frequency-of-use parameter associated with a contact for the current date each time a call is received from a telephone number associated with that contact and accepted by a user of the mobile phone;
    means for summing the second frequency-of-use values for each contact for the current date and for the number of days indicated by the time period parameter;

means for comparing the summed second frequency-of-use values of each contact to select the second set of contacts having the highest second frequency-of-use values;
means for sorting the second set of selected contacts in accordance with the summed second frequency-of-use values; and
means for populating the display with the sorted second set of selected contacts.

11. A mobile phone configured with an electronic telephone address-book having a plurality of contacts, the mobile phone comprising:
a display;
a memory;
a processor coupled to the memory and to the display, wherein the processor is configured with processor-executable instructions to perform operations comprising:
associating a frequency-of-use parameter with each contact for a current date and for each day indicated by a time period parameter identifying a number of days over which received calls and sent calls are to be monitored;
incrementing the frequency-of-use parameter associated with a contact for the current date each time a call is received from a telephone number associated with that contact;
incrementing the frequency-of-use parameter associated with a contact for the current date each time a call is sent to the telephone number associated with that contact;
summing the frequency-of-use values for each contact for the current date and for the number of days indicated by the time period parameter;
comparing the summed frequency-of-use values of each contact to select a number of contacts indicated by a configurable list size parameter having the highest frequency-of-use values;
sorting the selected contacts in accordance with the summed frequency-of-use values; and
populating the display with the sorted selected contacts.

12. The mobile phone of claim 11, wherein the processor is configured with processor-executable instructions to perform further operations comprising:
prompting a user to select a time period value;
receiving the user's selection of the time period value;
setting the time period parameter identifying a number of days over which received calls and sent calls are to be monitored as the time period value selected by the user.

13. The mobile phone of claim 11, wherein the processor is configured with processor-executable instructions such that incrementing the frequency-of-use parameter associated with a contact for the current date each time a call is received from a telephone number associated with the contact comprises:
incrementing the frequency-of-use parameter only when the received call is accepted by a user operating the mobile phone.

14. The mobile phone of claim 11, wherein the processor is configured with processor-executable instructions such that incrementing the frequency-of-use parameter associated with a contact for the current date each time a call is received from a telephone number associated with the contact comprises:
incrementing the frequency-of-use parameter only when the received call is not answered by a user operating the mobile phone.

15. The mobile phone of claim 11, wherein the processor is configured with processor-executable instructions to perform operations further comprising:

populating the display with a second set of selected contacts;
associating a second frequency-of-use parameter with each contact for a current date and for each day indicated by the time period parameter;
incrementing the second frequency-of-use parameter associated with a contact for the current date each time a call is received from a telephone number associated with that contact and accepted by a user of the mobile phone;
summing the second frequency-of-use values for each contact for the current date and for the number of days indicated by the time period parameter;
comparing the summed second frequency-of-use values of each contact to select the second set of contacts having the highest second frequency-of-use values;
sorting the second set of selected contacts in accordance with the summed second frequency-of-use values; and
populating the display with the sorted second set of selected contacts.

16. A non-transitory processor-readable storage medium having stored thereon processor-executable instructions configured to cause a mobile phone processor to perform operations comprising:
associating for each contact in an electronic telephone address-book a frequency-of-use parameter with a current date and for each day indicated by a time period parameter identifying a number of days over which received calls and sent calls are to be monitored;
incrementing the frequency-of-use parameter associated with a contact for the current date each time a call is received from a telephone number associated with that contact;
incrementing the frequency-of-use parameter associated with a contact for the current date each time a call is sent to the telephone number associated with that contact;
summing the frequency-of-use values for each contact for the current date and for the number of days indicated by the time period parameter;
comparing the summed frequency-of-use values of each contact to select a number of contacts indicated by a configurable list size parameter having the highest frequency-of-use values;
sorting the selected contacts in accordance with the summed frequency-of-use values; and
populating a display with the sorted selected contacts.

17. The non-transitory processor-readable storage medium of claim 16, wherein the stored processor-executable instructions are configured to cause the mobile phone processor to perform further operations, comprising:
prompting a user to select a time period value;
receiving the user's selection of the time period value;
setting the time period parameter identifying a number of days over which received calls and sent calls are to be monitored as the time period value selected by the user.

18. The non-transitory processor-readable storage medium of claim 16, wherein the stored processor-executable instructions are configured to cause the mobile phone processor to perform operations such that incrementing the frequency-of-use parameter associated with a contact for the current date each time a call is received from a telephone number associated with the contact comprises:
incrementing the frequency-of-use parameter only when the received call is accepted by a user operating the mobile phone.

19. The non-transitory processor-readable storage medium of claim 16, wherein the stored processor-executable instructions are configured to cause the mobile phone processor to perform operations such that incrementing the frequency-of-use parameter associated with a contact for the current date each time a call is received from a telephone number associated with the contact comprises:
  incrementing the frequency-of-use parameter only when the received call not answered a user operating the mobile phone.

20. The non-transitory processor-readable storage medium of claim 16, wherein the stored processor-executable instructions are configured to cause the mobile phone processor to perform operations further comprising:
  populating the display with a second set of selected contacts;
  associating a second frequency-of-use parameter with each contact for a current date and for each day indicated by the time period parameter;
  incrementing the second frequency-of-use parameter associated with a contact for the current date each time a call is received from a telephone number associated with that contact and accepted by a user of the mobile phone;
  summing the second frequency-of-use values for each contact for the current date and for the number of days indicated by the time period parameter;
  comparing the summed second frequency-of-use values of each contact to select the second set of contacts having the highest second frequency-of-use values;
  sorting the second set of selected contacts in accordance with the summed second frequency-of-use values; and
  populating the display with the sorted second set of selected contacts.

* * * * *